United States Patent [19]
Osch

[11] 4,180,931
[45] Jan. 1, 1980

[54] DISPLAY DEVICE

[76] Inventor: John V. Osch, 3415 S. Honey Creek Ct., Milwaukee, Wis. 53219

[21] Appl. No.: 840,825

[22] Filed: Oct. 11, 1977

[51] Int. Cl.[2] .......................................... G09F 13/12
[52] U.S. Cl. ............................... 40/219; 250/211 K; 272/8 M; 40/427
[58] Field of Search ................ 40/219, 502; 272/8 D, 272/8 M, 8.5, ; 250/211 K

[56] References Cited
U.S. PATENT DOCUMENTS

| | | | |
|---|---|---|---|
| 1,499,400 | 7/1924 | Oswald | 282/8.5 |
| 3,171,034 | 2/1965 | Tomasulo | 250/211 K X |
| 3,256,013 | 6/1966 | Kelsey | 272/8.5 |
| 3,256,014 | 6/1966 | Kelsey | 40/219 X |
| 3,639,769 | 2/1972 | Clark | 250/211 K |
| 3,808,721 | 5/1974 | Gersch | 40/502 |

OTHER PUBLICATIONS

IBM Disclosure Bulletin Volume 17 #4 dated Sep. 1974; p. 989

Primary Examiner—Louis G. Mancene
Assistant Examiner—Enceslao J. Contreras

[57] ABSTRACT

The display device includes a housing having a viewing opening, an angularly disposed light transmitting mirror dividing the housing into rear and front display compartments located at right angles to each other, and lamps for illuminating each of the display compartments. One of the lamps is sequentially and alternately brightened, while the other is simultaneously dimmed, by a control including a pair of photocells which control the electrical power to each of the lamps in response to the amount of light falling thereon, a light source adapted to emit light onto both of the photocells and an opaque disc which is interposed the light source and the photocells and is slowly rotated by a motor. The disc includes a window portion which is arranged to sequentially and alternately gradually vary the amount of light from the light source reaching each of the photocells during the rotational cycle of the disc.

18 Claims, 10 Drawing Figures

DISPLAY DEVICE

BACKGROUND OF THE INVENTION

This invention relates to display devices and, more particularly, to display devices which are arranged to display separate sets of objects, printed matter, pictures or the like through a viewing window or opening in a manner whereby one set appears to gradually fade out while the other gradually comes into view.

Display devices of this type are well known and usually include an angularly disposed one-way or light transmitting mirror which divides the housing into rear and front display compartments located at right angles to each other. The display compartments are illuminated by separate illuminating means. When the front display compartment is illuminated, the image of the display in the front chamber reflects off the mirror and is observable from the viewing opening. When the rear display compartment is illuminated, the image of the display in the rear display compartment is observable directly through the mirror toward the viewing opening.

Some type of control is usually provided for sequentially and alternately brightening one of the illuminating means while simultaneously darkening or dimming the other illuminating means so that the displays alternate and appear to blend or dissolve together as one fades while the other one becomes more prominent. Exemplary prior art constructions for display devices of this type are disclosed in U.S. Pat. Nos. 609,009, 909,450, 2,112,314, 2,359,069, 2,487,307, 3,256,013, and 3,256,014.

The controls employed in prior art devices, such as those disclosed in the above-identified patents, typically are quite complex and require numerous moving parts. Also, most prior art devices are not arranged so that two or more sets of different printed or pictorial matter can be alternately displayed in the same display compartment.

SUMMARY OF THE INVENTION

A principal object of the invention is to provide a display device of the above-described type including a simplified and reliable control for sequentially and alternately brightening and dimming the illuminating means.

Another principal feature of the invention is to provide a display device including a control which, in addition to controlling and dimming the illuminating means, also controls the timing between full ilumination of the displays and the start of the merging or dissolving cycle.

A further principal object of the invention is to provide such a display device which is capable of alternately and sequentially displaying two or more displays in one or both of the display compartments in a repeating cycle.

A still further principal object of the invention is to provide a display device described in the preceding paragraph including a simplified, compact control for controlling both the brightening and dimming of the illuminating means and automatically controlling movement of the multiple displays from a nondisplay position to a display position.

Other objects, aspects and advantages of the invention will become apparent to those skilled in the art upon reviewing the following detailed description, the drawings and the appended claims.

The invention provides a display device including a housing having a viewing opening, an angularly disposed one-way or light transmitting mirror dividing the housing into first and second display compartments located at substantially right angles to each other, illuminating means for illuminating each of the display compartments, and a control for sequentially and alternately brightening one of the illuminating means while simultaneously dimming the other so as to cause the displays in the display compartments to merge and alternate when viewed through the viewing opening. The control includes an electrical circuit interconnecting the illuminating means to a source of electrical power and having a first pair of photosensitive devices, each adapted to control the amount of electrical power into one of the illuminating means in response to the amount of light falling thereon, a light source adapted to emit light onto both of the photosensitive devices, light interrupting means interposed and mounted for movement relative to the light source and the photosensitive devices, and means for moving the light interrupting means through a repeating cycle. The light interrupting means has a window portion which, in response to the cyclic movement of the light interrupting means, is adapted to sequentially and alternately gradually vary the amount of light from the light source reaching each of the photosensitive devices.

In one embodiment, the light interrupting means includes a rotatable disc having an arcuate slot forming the window portion and the slot is covered with a material which, with respect to the slot, has a substantially transparent central portion and opposite end portions extending from the central portion. Each of the end portions gradually increase in density to light, in a direction away from the central portion, from substantially transparent to substantially opaque. Alternately, the window portion can be a crescentshaped, open slot in the disc providing a variable area through which light from the light source can reach the photosensitive devices. In either case, the slot preferably is arranged so that the midpoints of the end portions thereof are alternately disposed over both of the photosensitive devices during two separate portions of the rotational cycle of the disc.

In another embodiment, the device is arranged to display a plurality of display transparencies in each of the display compartments. In this embodiment, a hollow transparent drum carrying a plurality of display transparencies on a peripheral surface thereof is rotatably mounted in each of the display compartments and an illuminating means is disposed inside each of the drums. The drums are driven by separate motors and a control is provided for alternately and sequentially energizing the drum drive motors for a predetermined time interval whereby one drum is rotated to move a display transparency from a display position to a nondisplay position and to move the next display transparency from a nondisplay position to a display position in which the respective illuminating means is dimmed and the other illuminating means is brightened.

In one embodiment, this latter control is provided by a second pair of photosensitive devices which are located in spaced relation to the first pair of photosensitive devices and are arranged to selectively energize the drum drive motors when a further opening or slot in the disc passes thereover. With this arrangement, the disc controls the dissolve of the illuminating means and also serves as the means for timing energization of the drum motors. Separate means preferably is provided for deenergizing the drum motors so as to insure that the transparencies are properly indexed relative to the illuminating means and the mirror after each cycle.

DESCRIPTION OF THE PREFERRED EMBODIMENTS

Figure 1:
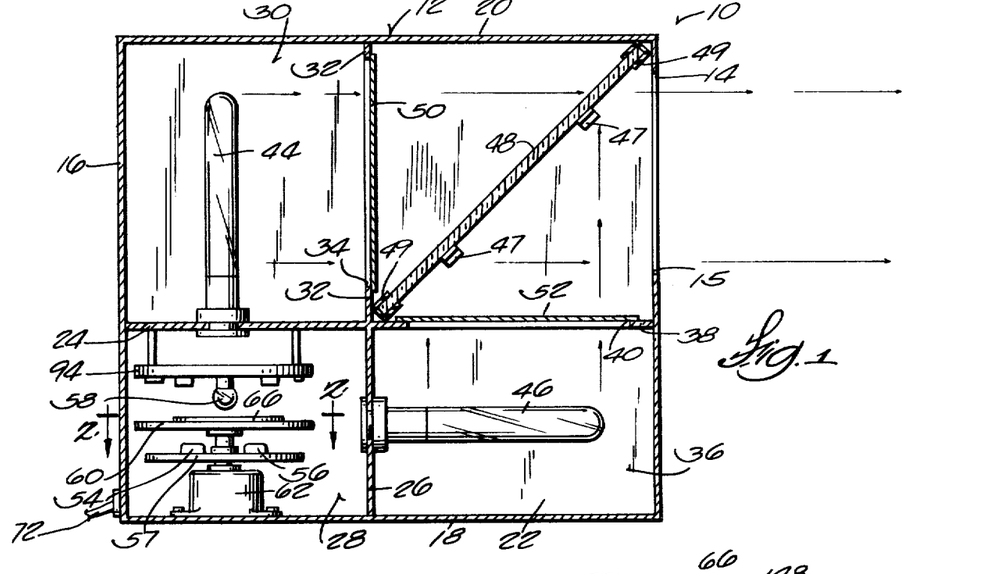
FIG. 1 is a sectional side view of a display device embodying the invention.

Illustrated in FIG. 1 is a display device 10 including a housing 12 having a front wall 14 including a transparent window or viewing opening 15, a rear wall 16, a bottom wall 18, a top wall 20 and opposed side walls 22 (one shown). Extending generally perpendicularly from the rear wall 16 and the bottom wall 18, respectively, are a pair of partitions 24 and 26 which define a closed equipment compartment 28.

Located inside the upper rear portion of the housing 12 is a first or rear display compartment 30 formed in part by a front ledge or flange 32 defining a vertical opening 34 generally aligned with the viewing opening 15. located inside the lower front portion of the housing 12 is a second or front display compartment 36 which is disposed at right angles to the rear display compartment 30 and is formed in part by an upper ledge or flange 38 defining a horizontal opening 40.

The rear and front display compartments 30 and 36 are separately illuminated by suitable illuminating means such as by respective elongated incandescent lamps 44 and 46 removably installed in suitable sockets mounted on the respective partitions 24 and 26.

A one-way or light transmitting mirror 48 is positioned inside the housing 12 between the viewing opening 15 and the rear and front display compartments 30 and 36 and at a 45° angle to the openings 34 and 40. The mirror 48 is made from a material which reflects light emitted through the opening 40 in the front display compartment 36 toward the viewing opening 15 and transmits light emitted through the opening 34 in the rear display compartment 40 directly toward the viewing opening 15. Various suitable materials can be used for this purpose such as commercially available architectural window glasses which reflect solar rays in one direction and are transparent in the other direction. This type glass usually has a higher reflectance than transmittance, in which case the lamp 44 in the rear display compartment 30 preferably has a higher intensity than the lamp 46 in the front display compartment 36 so that the images from displays in both compartments are observed at substantially the same intensity through the viewing opening 15.

The mirror 48 preferably is removably supported, such as on support brackets 47 mounted on the side walls 22, so it can be removed for periodic cleaning. A rubber channel 49 can be mounted over the peripheral edges of the mirror 48 for protection against chipping during handling, installation and/or removal.

In the specific construction illustrated, each of the openings 34 and 40 is covered by a respective transparency 50 and 52 including advertising indicia such as pictures or other printed matter. The transparencies 50 and 52 are removably supported on the respective flanges 32 and 38 in a suitable manner. When the rear display compartment 30 is fully illuminated with the front display compartment 36 darkened, the indicia or image from the transparency 50 is observable through the viewing opening 15. Conversely, when the front display compartment 36 is fully illuminated with the rear display compartment 30 darkened, the indicia or image from the transparency 52 appears at the same location when viewed through the viewing opening 15.

If desired, one or both of the display compartments can be arranged so that three-dimensional objects, such as food products or the like, can be displayed. That is, one or both of the display compartments is arranged so that the lamp is shielded or masked from a direct line of sight with the respective openings 34 and 40 and the image of an object located inside the display compartment is reflected from the interior surfaces thereof toward the mirror 48.

Located in the equipment compartment 28 is a control 53 for sequentially and alternately brightening one of the lamps 44 and 46 while simultaneously darkening or dimming the other lamp. In the specific construction illustrated in FIGS. 1-4a, the control 53 includes a pair of photosensitive devices 54 and 56 supported on a stationary platform 57 in the equipment compartment 28. Each of the photocells 54 and 56 is electrically interconnected between a source of electrical power and the lamps 46 and 48, respectively. The photosensitive devices 54 and 56 are operable to control the amount of electrical power to the respective lamps 44 and 46 in response to the amount of light falling thereon.

The control 53 also includes a light source, such as a small incandescent lamp 58, disposed in the equipment compartment 28 above and at a generally central location relative to the photosensitive devices 54 and 56 and an opaque turntable or disc interposed the control lamp 58 and the photosensitive devices 54 and 56. The disc 60 is slowly rotated by a small electric motor 62 mounted on the housing bottom wall 18 and serves to control the amount of light from the control lamps 58 reaching the photosensitive devices 54 and 56.

The disc 60 has an arcuate slot 64 (illustrated by solid lines in FIGS. 2 and 3) which extends through an arc of approximately 260° and is located to travel over the photosensitive devices 54 and 56 as the disc 60 is rotated by the control motor 62. The slot 64 is covered by a material 66 such as a photographic film which, with respect to the slot 64, has a substantially transparent central portion 68 extending through an arc of about 100° and opposite end portions 70a and 70b, each extending through an arc of about 80° in opposite directions from the central portion 68. The arcuate lengths of these portions can be varied and specific values have been described only for illustrative purposes. The end portions 70a and 70b are shaded in a manner so their density to light gradually increases in a direction away from the central portion 68 from translucent (i.e., nearly transparent) to substantially opaque.

Figure 2:
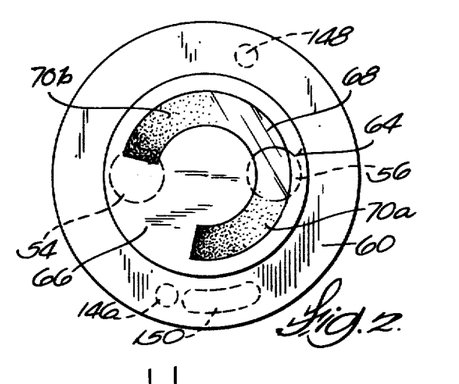
FIG. 2 is a view taken generally along line 2—2 in FIG. 1 showing the location of the control disc at one point in its rotational cycle.

In FIG. 2, the disc 60 is in a position where the central portion 68 is located over the photosensitive device 56 which controls the illumination of the lamp 46 and the opaque portion of the disc 60 is located over the photosensitive device 54 which controls the illumination of the lamp 44. In this position, the lamp 46 is at full brightness and the lamp 44 is fully darkened or dimmed. Thus, only the image from the transparency 52 in the front display compartment 36 is observable through the viewing opening 15.

Figure 3:
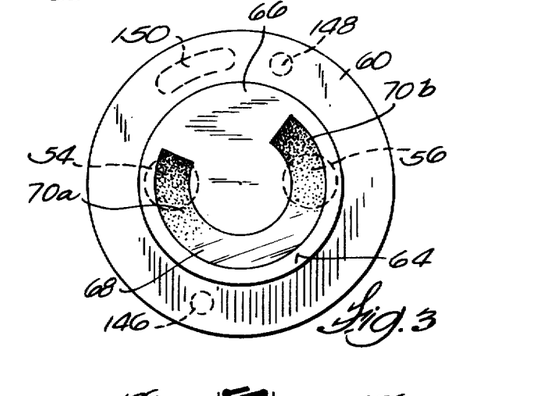
FIG. 3 is a view similar to FIG. 2 showing the location of the control disc at another point in its rotational cycle.

As the disc is rotated in the clockwise direction, the lamp 46 remains at full brightness and the lamp 44 remains fully dimmed until the end portion 70b of the slot 64 starts to pass over the photosensitive device 56 and the other end portion 70a of the slot 64 starts to pass over the photosensitive device 54 as shown in FIG. 3. During continued rotation of the disc 60, the gradually increasing density of the end portion 70b causes a gradually decreasing amount of light from the control lamp 58 to reach the photosensitive device 56 while the gradually decreasing density of the end portion 70a simultaneously causes a gradually increasing amount of light to reach the photosensitive device 54. As a result, the lamp 46 gradually increases in brightness causing the image of the transparency 52 to start fading while the lamp 44 simultaneously gradually increases in brightness, causing the image from the transparency 50 in the rear display compartment 30 to start becoming observable.

When the midpoints of the end portions 70a and 70b are located over the photosensitive devices 54 and 56, an equal amount of light reaches each of the photosensitive devices and the lamps 44 and 46 are at the same relatively level brightness, i.e., about half way to full brightness, resulting in the images from the transparencies 50 and 52 appearing to be blended or dissolved together. During continued rotation of the disc 60, the lamp 44 continues to gradually increase in brightness and eventually comes up to full brightness when the central portion 68 is located over the photosensitive device 54. Simultaneously, the lamp 46 continues to dim and eventually is fully dimmed when the opaque portion of the disc is located over the photosensitive device 56. At this point in the cycle, only the image from the transparency 50 is observable from the viewing opening 15.

It can be appreciated that this cycle is reversed as the end portion 70b moves over the photosensitive devcie 54 and the end portion 70a moves over the photosensitive device 56.

Figures 4A, 4B:
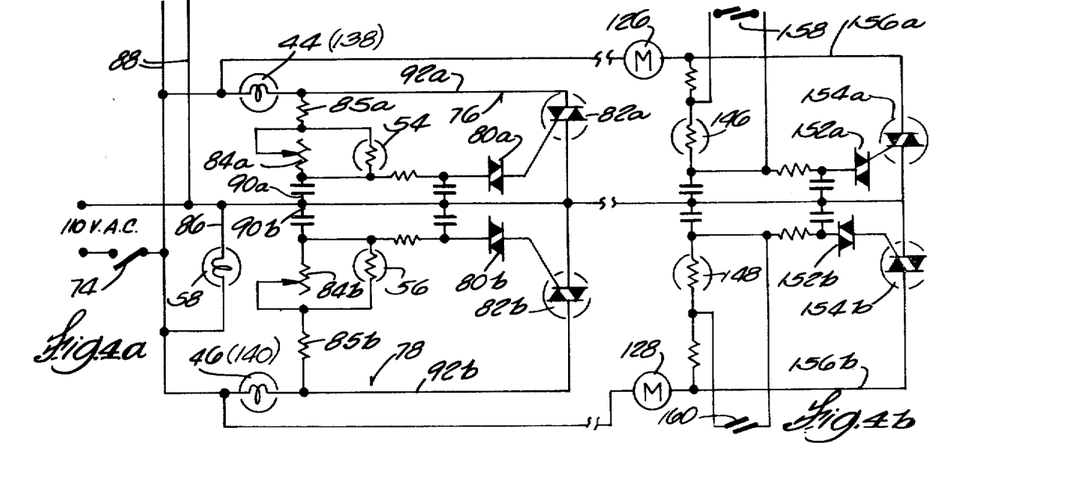
FIGS. 4a and 4b are schematic representations of the electrical control system.

For operation, the display device is connected to a standard 110 volt A.C. outlet by a plug-in cable 72. FIG. 4a schematically illustrates an exemplary electrical system for the control 53 including a conventional on-off switch 74 and separate circuits, designated generally by reference numerals 76 and 78, for the respective lamps 44 and 46.

Each of the circuits 76 and 78 has a respective diac trigger 80a and 80b and a respective triac 82a and 82b connected in series between the lamps 44 and 46 and the photosensitive devices 54 and 56. In the specific electrical system illustrated, the photosensitive devices 54 and 56 are conventional cadmium sulfide photocells having an internal resistance which decreases in proportion to the increased amount of light falling thereon. Each of the circuits 76 and 78 also includes a respective variable resistor 84a and 84b which can be adjusted to control the sensitivity of the photocells 54 and 56 in the usual manner and a respective resistor 85a and 85b through which a trickle voltage is supplied to the lamps 44 and 46 any time the switch 74 is closed. This trickle voltage is low enough to prevent appreciable illumination of the lamps 44 and 46 so that the image from the transparency in the darkened display compartment is disguised by the image from the transparency in the illuminated display compartment.

When switch 74 is closed, electrical power for turning on the control lamp 58 is supplied thereto through a lead 86 and electrical power for energizing the control motor 62 is supplied thereto through a pair of leads 88. Electrical power is also supplied to the photocells 54 and 56 through respective leads 90a and 90b.

Assuming the disc 60 is in the position shown in FIG. 2, the photocell 56 is fully exposed to light from the control lamp 58 and the photocell 54 is shut off from light. The resistance through the photocell 54 is high enough to prevent triggering of the diac 80a and only a trickle of voltage is supplied to the lamp 44 through the resistor 85a as explained above. On the other hand, the photocell 56 is fully exposed to light from the control lamp 58, causing the resistance thereof to decrease to a point where the diac 80b triggers the triac 82b which supplies a full illuminating voltage to the lamp 46 through a lead 92b. As the disc 60 rotates past the position shown in FIG. 3, the decreasing amount of light falling on the photocell 56 causes a proportional reduction in the voltage supplied to the lamp 46 through the triac 82b. At the same time, the increasing amount of light falling on the photocell 54 causes triggering of the diac 80a and the triac 82a thereafter supplies voltage to the lamp 44 via the lead 92a, which voltage is proportional to the amount of light falling on the photocell 54.

From this description, the manner in which the electrical system sequentially and alternately brightens one lamp while simultaneously dimming the other during continued rotation of the disc 60 should be self-evident to those skilled in the art. Accordingly, further description of the electrical system operation is deemed unnecessary for a full understanding of the invention.

To simplify assembly and replacement, the various components of the electrical system, except the switch 74 and the photocells 54 and 56, preferably are mounted on a board or panel 94 which is removably mounted on the partition 24. The electrical leads to the lamp 44 and 46, the photocells 54 and 56, the motor 62 and the switch 74 preferably are connected in the circuit by conventional plug-in connectors. With this arrangement, faulty electrical components can be conveniently replaced without rewiring by simply disconnecting the leads, removing the panel 94 and replacing it with another panel. This arrangement also minimizes the amount of space required for the electrical system and permits a more compact overall construction.

Figure 5:
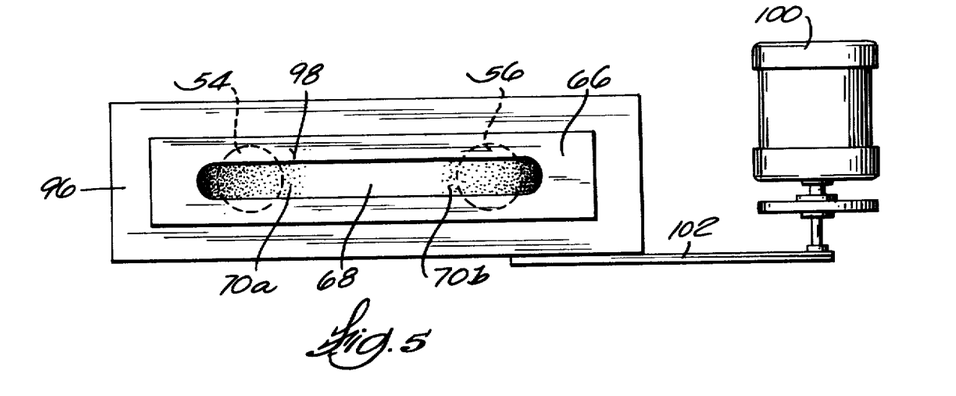
FIG. 5 is a top plan view of an alternate light interrupting means.

FIG. 5 illustrates an alternate arrangement for the light interrupting means. In this arrangement, the rotating disc 60 is replaced by an elongated opaque member 96 which is mounted for reciprocative movement along a longitudinal axis between the control lamp 58 and the photocells 54 and 56. The member 96 includes an elongated slot 98 which, other than extending longitudinally instead of being arcuate, is arranged in the same basic manner as the slot 64 in the disc 60. That is, the slot 98 is covered with the same type of material 66 having a transparent central portion 68 and opposite end portions 70a and 70b of gradually increasing density to light in the direction away from the central portion 68. The photocells 54 and 56 are located on a longitudinal axis of the slot 98 in axially spaced relationship.

The member 96 is moved back and forth between the control lamp 58 and the photocells 54 and 56 by a small electric motor 100 which is suitably connected to the member 96 to provide a continuous reciprocative movement, such as by a crank arm 102 (illustrated diagrammatically). In FIG. 5, the member 96 is shown at a location where an equal amount of light reaches each of the photocells 54 and 56.

As the member 96 is moved through a reciprocative cycle, it sequentially and alternately brightens one of the lamps 44 and 46 while simultaneously dimming the other in substantially the same manner as described above. For example, as the member 96 is moved to the right from the middissolve position shown in FIG. 5, the gradually decreasing density of the slot end portion 70b passing over the photocell 56 causes a gradual brightening of the lamp 46 to a fully bright condition when the slot central portion 68 is located over the photocell 56. The gradually increasing density of the slot end portion 70a passing over the photocell 56 at the same time causes a gradually dimming of the lamp 44 to a fully dimmed condition when the opaque portion of the member 96 adjacent the slot 98 is located over the photocell 54. Movement of the member 96 to the left produces the reverse effect.

Figure 6:
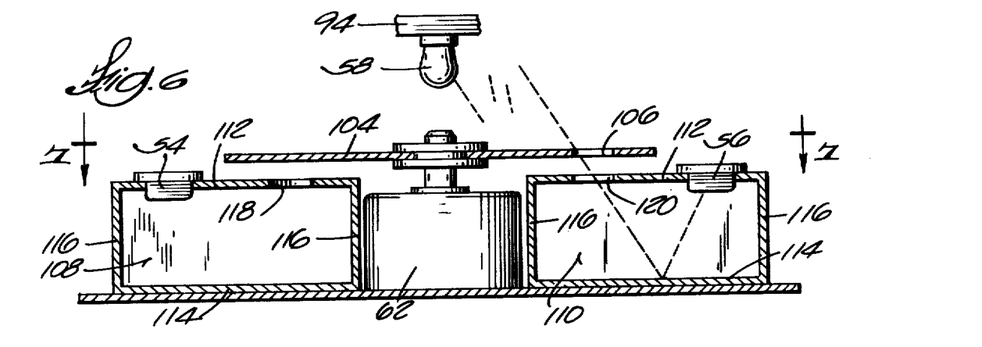
FIG. 6 is a fragmentary, sectional view of an alternate arrangement for the control disc.
Figure 7:
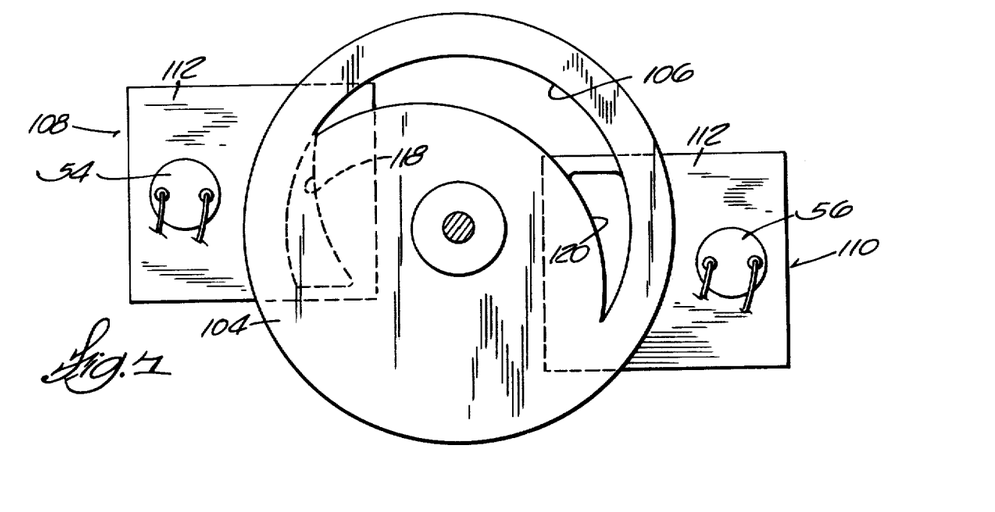
FIG. 7 is a view taken generally along line 7—7 in FIG. 6.

FIGS. 6 and 7 illustrate an alternate arrangement wherein the light interrupting means employs a slot having a variable area for controlling the brightening and dimming of the lamps 44 and 46. In this arrangement, the electrical system is arranged in the same manner as described above and the control motor 62 rotates an opaque disc 104 including a crescent-shaped, open slot 106.

Located in the equipment chamber 28 in generally diametrically opposed relation to the rotational axis of the disc 104 are a pair of light reflecting chambers 108 and 110. Each of the light reflecting chambers 108 and 110 includes a top wall 112, a bottom wall 114, and opposed side walls 116 (two shown) having a light reflecting interior surfaces and is substantially closed except for an aperture 118 and 120 in the respective top wall. The apertures 118 and 120 have a shape generally corresponding to the shape of one end portion of the slot 106 in the direction of travel. As shown, the disc 104 is rotated in the clockwise direction and the apertures 118 and 120 have a shape corresponding to the righthand end portion of the slot 106.

The photocells 54 and 56 are mounted on the top wall 112 of the respective light reflecting chambers 108 and 110 in radially outward spaced relationship to the respective apertures 118 and 120 with the light sensing surface thereof facing the bottom wall 114.

As the disc 104 is rotated, the open slot 106 gradually uncovers one of the apertures 118 and 120 while it gradually covers the other aperture. In the position shown in FIGS. 7 and 8, the disc 104 has reached a point where the aperture 118 in the light reflecting chamber 108 is completely covered and the aperture 120 in the light reflection chamber 110 is completely uncovered by the righthand portion of the slot 106. The light entering through the aperture 120 reflects off the interior surfaces of the light reflecting chamber 110 and is generally uniformly distributed over the entire light sensing surface of the photocell 56. At that point, the lamp 46 in the front display compartment 36 is at a fully bright condition and the lamp 44 in the rear display compartment 30 is fully dimmed.

Figure 8:
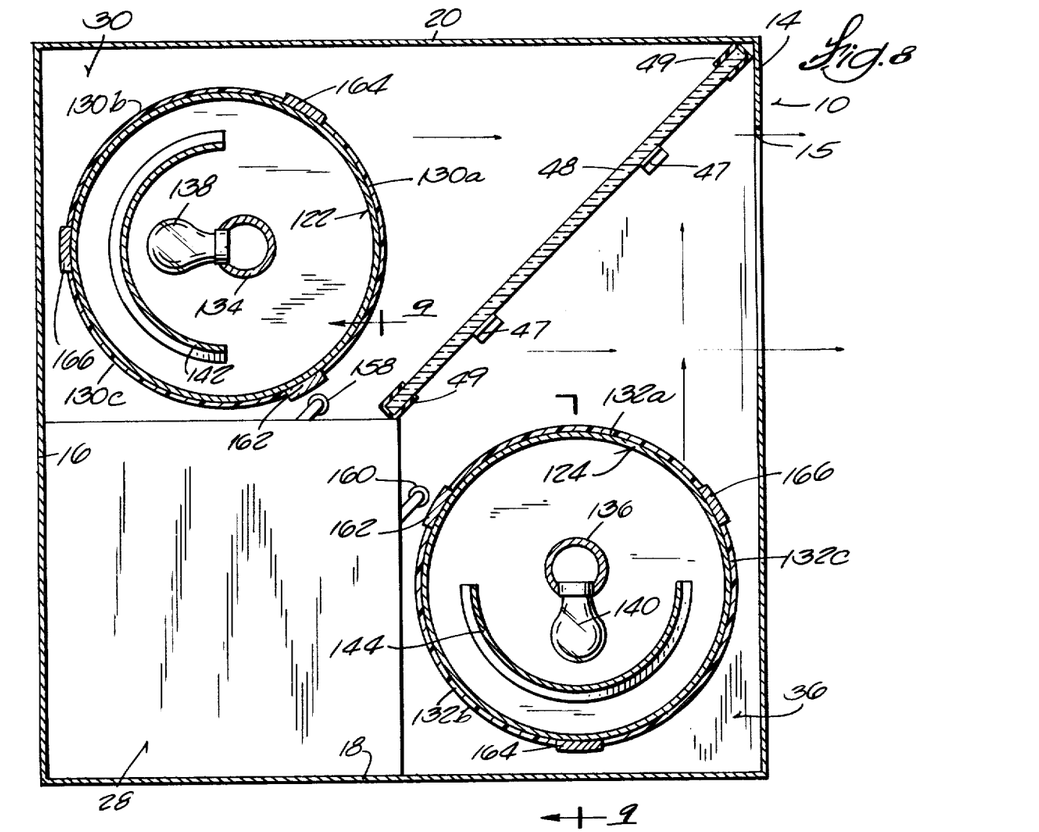
FIG. 8 is a side sectional view of an alternate construction of the display device which is capable of displaying two or more displays in each of the display compartments.

As the disc 104 continues to rotate in the clockwise direction, the righthand portion of the slot 106 gradually uncovers the aperture 118 in the light reflecting chamber 108 while the left end portion of the slot 106 simultaneously gradually covers the aperture 120 in the light reflecting chamber 110. The gradually increasing amount of light admitted into the light reflecting chamber 108 through the aperture 118 causes the lamp 44 to gradually increase in brightness while the gradually decreasing amount of light admitted into the light reflecting chamber 110 through the aperture 120 causes the lamp 46 to gradually dim. When the disc 104 reaches a position 180° from that shown, the lamp 44 is at a fully bright condition and the lamp 46 is fully dimmed.

The photocells 54 and 56 can be located directly under the travel path of the slot 106 with the light sensing surfaces thereof facing the control lamp 58. While such an arrangement eliminates the need for the light reflecting chambers 108 and 110, it has been found to be less desirable when the above-described dissolve effect is desired. That is, instead of the light being uniformly distributed over the entire light sensing surfaces of the photocells, the gradually uncovered portion of a photocell is caused to carry more current and there is no real cutoff until the photocell is completely covered, at which time there is a relative rapid drop off in the voltage supply to the lamp rather than a gradual and uniform reduction in lamp voltage. However, in applications where a uniform dissolve is not particularly important, such an arrangement may be preferred because of its simplicity.

When light reflecting chambers are used, the apertures 118 and 120 most preferably are shaped in a general manner illustrated in FIGS. 7 and 8. It has been found that the reduction of light admitted through a variable area slot is more closely to logarithmic than linear. Consequently, if a slot or hole of substantial uniform width is used as the opening in the light reflecting chambers, the brightness of the lamps 44 and 46 suddenly drops at some point of closure depending on the size and geometry of the opening.

Figure 9:
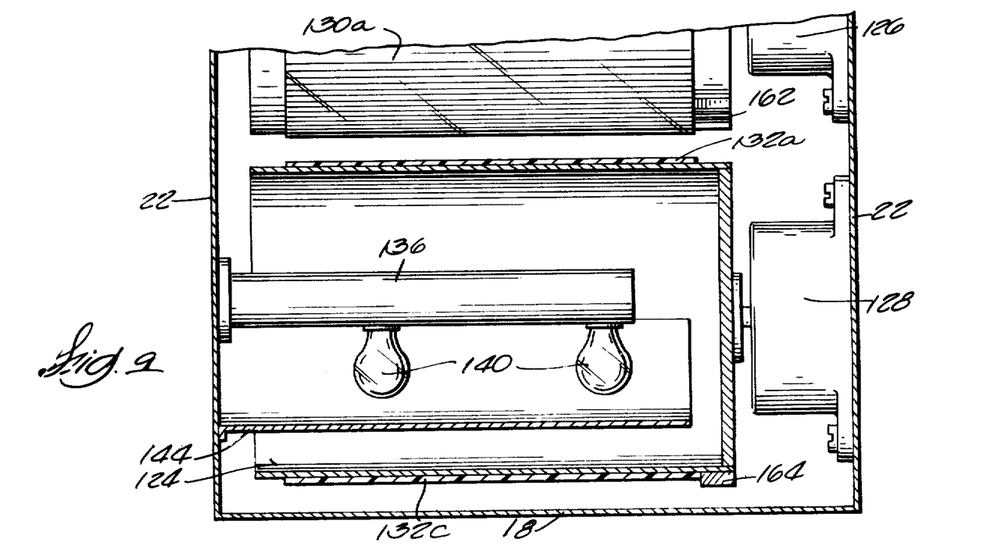
FIG. 9 is a view taken generally along line 9—9 in FIG. 8.

FIGS. 8 and 9 illustrate an alternate construction of the display device which is adapted to display a plurality of transparencies in each of the display compartments. Common reference numerals have been assigned to components which are common with the construction illustrated in FIGS. 1–4a. The construction illustrated in FIGS. 8 and 9 includes an electrical system similar to that described above, except as specifically noted below, and can include any of the light interrupting arrangements described above.

Rotatably mounted in the front and rear of the display compartments 30 and 36 are respective horizontally extending, hollow, transparent drums 122 and 124. The drums 122 and 124 are open at one end and at the other end are suitably connected to the drive shaft of respective small electric motors 126 and 128 for rotation thereby about a horizontal axis. The drum motors 126 and 128 are mounted on one of the side walls 22 of the housing 12 and are electrically connected to the electrical control system as described below.

A plurality of circumferentially spaced display transparencies are suitably removably mounted on either the inner or outer periphery of each of the drums 122 and 124. In the specific construction illustrated, three display transparencies 130a, 130b and 130c are mounted on the outer periphery of the drum 122 and three display transparencies 132a, 132b and 132c are mounted on the outer periphery of the drum 124.

Extending through the open end and into the interior of each of the drums 122 and 124 are respective stationary cylindrical fixtures 134 and 136 which are mounted on the housing side wall 22 opposite to the drum motors 126 and 128. Supported on the fixture 134 is a pair of incandescent lamps 138 (one shown) for illuminating one of the transparencies on the drum 122, i.e., the transparency 130a, located in a display position in front of the lamps 138 and aligned with the viewing opening 15. Supported on the fixture 136 is a pair of incandescent lamps 140 for illuminating one of the transparencies on the drum 124, i.e., the transparency 132a, located in a display position above the lamps 140 and aligned with the mirror 48. The electrical leads (not shown) for the lamps 138 and 140 extend through the interior of the respective fixtures 134 and 136.

Extending through the open end and into the interior of each of the drums 122 and 124 are respective semi-cylindrical light reflectors 142 and 144 which are suitably mounted on the housing side wall 22 opposite to the drum motors 126 and 128. These reflectors serve to improve the illuminating effect of the lamps 138 and 140.

In the position shown in FIG. 8, the image from the transparency 130a is observable through the viewing opening when the lamps 138 are at full brightness and the lamps 140 are dimmed and the image from the transparency 132a is observable through the viewing opening 15 when the lamps 140 are at full brightness and the lamps 138 are dimmed.

In accordance with one embodiment of the invention, means are provided for selectively energizing the drum motors 126 and 128 for predetermined time intervals to move a transparency from the display position to a nondisplay position and to move the next transparency from the nondisplay position to the display position while the respective display compartment is darkened and the other display compartment is fully illuminated.

FIG. 4b schematically illustrates an exemplary auxiliary circuit for incorporating such an additional control function into the basic control circuit illustrated in FIG. 4a. The lamps 138 and 140 are numbered parenthetically in FIG. 4a. Reference is also made to FIGS. 2 and 3 which illustrate certain components of the additional control in dashed lines.

Mounted on the platform 57 (FIGS. 2 and 3) in generally diametrically opposed relation to the rotational axis of the disc 60 and circumferentially spaced from the photocells 54 and 56 is a second pair of photocells 146 and 148. Provided in the disc 60 is an opening or slot 150 for periodically exposing each of the photocells 146 and 148 to light from the control lamp 58 during rotation of the disc 60.

As shown in FIG. 4b, the photocells 146 and 148 are electrically connected in series with respective drum motors 126 and 128 through a respective diac trigger 152a and 152b and a respective triac 154a and 154b. As the disc slot 150 moves over and thereby exposes each of the photocells 146 and 148 to light, the drum motors 126 and 128 are energized through respective leads 156a and 156b.

The photocells 146 and 148 and the slot 150 are located so that each of the photocells are exposed to light when the respective lamps 138 and 140 are in a fully dimmed condition. For example, in the position shown in FIG. 2, the dissolve involving the transparency 130a on the drum 122 has been completed. The lamps 138 are fully dimmed by virtue of its control photocell 54 being cut off from light and the lamps 140 are at a fully bright condition. As the slot 150 moves over the photocell 146, the drum motor 126 is energized to rotate the drum 122 and move the next transparency 130b to the display position. Similarly, when the slot 150 subsequently moves over the photocell 148 during continued rotation of the disc 60, while the lamps 140 are fully dimmed and the lamps 138 are in a fully bright condition, the drum motor 128 is energized to rotate the drum 124 and move the next transparency 132b to the display position. With this arrangement, the disc 60 provides the dissolve control for the lamps 138 and 140 and also provides the timing for starting rotation of the drums 122 and 124.

While the slot 150 can be arranged to serve as the sole means for controlling the time the drum motors 126 and 128 are energized, there is usually some time lag between the time light is cut off from the photocells and the drum motors are completely deenergized. Accordingly, separate means preferably are provided to insure proper indexing of the drums relative to the respective lamps and the mirror 48.

In the specific construction illustrated, such indexing means includes a pair of conventional reed switches 158 and 160 including normally closed contacts which are carried on reeds located inside a sealed capsule and are actuated open by an external magnetic field produced by a permanent magnet brought into close proximity with the contact reeds. The reed switches 158 and 160 are mounted inside the housing 12 at a location close to the travel path of the drums 122 and 124, respectively.

As shown in FIG. 4b, the contacts of the reed switches 158 and 160 are connected in parallel with the respective photocells 146 and 148 and electrical power is supplied to the respective drum motors 126 and 128 when the contacts are closed. Three permanent magnets 162, 164 and 166 having the appropriate polarity for actuating the contacts of the reed switches 158 and 160 open are mounted on the outer periphery of each of the drums 122 and 124 adjacent the leading edge of each of the transparencies.

Operation of the indexing system is the same for both drums and will be described only for the drum 122. The drum motor 126 is energized to start rotation of the drum 122 in a clockwise direction as soon as the disc slot 150 starts to pass over and expose the photocell 146 to light from the control lamps 158. After the disc slot 150 has passed completely over the photocell, it is now ineffective for supplying power to the drum motor 126. However, power continues to be supplied to the drum motor 126 through the contacts of the reed switch 56 which are now closed because the magnet 162 has been moved some distance therefrom. When the next magnet 164 is moved into close proximity to the reed switch 158, it is actuated open and the drum motor 126 is deenergized to stop rotation of the drum 122. During the next cycle, power is initially supplied to the drum motor 126 through the photocell 146 as the disc slot 150 starts to pass thereover. The magnet 164 is moved far enough from the reed switch 158 to permit its contacts to return to the normally closed position before the disc slot 150 has moved completely past the photocell 146.

For some applications, it may be desirable to use a single display in one display compartment and a multiple display on the other display compartment. In such a case, one of the drums and the associated circuitry and electrical components can be omitted.

From the above description, it can be seen that the control provided by the invention, while simple and reliable, is capable of providing excellent dissolve and can also be arranged to provide the timing for moving drums of multiple transparency units. The duration of the dissolve and the intervals of the dissolve can be varied by simply varying the speed of the control motor, length of the slot in the control disc or member, the spacing of the lamp control photocells and/or the gradation of the density of the material covering the slot.

I claim:
1. A display device comprising
 a housing having a viewing opening, a first display compartment substantially aligned with said viewing opening and a second display compartment disposed at substantially a right angle to said first display compartment;
 a light transmitting mirror located inside said housing between said viewing opening and said display compartments and disposed at an angular relationship with said display compartments;
 illuminating means in each of said display compartments for transmitting light toward said mirror;
 a display transparency bearing indicia disposed in each of said display compartments between the respective illuminating means and said mirror; and
 control means for sequentially and alternately brightening one of said illuminating means while simultaneously dimming the other of said illuminating means so as to cause the indicia on both of said display transparencies to merge and alternate when viewed through said viewing opening, said control means comprising
  electrical circuit means interconnecting said illuminating means with a source of electrical power, said circuit means including first and second voltage controls, each electrically interconnected between one of said illuminating means and said power source, and further including first and second photosensitive devices, each electrically connected to one of said voltage controls for regulating the voltage supplied through the respective voltage control to the respective illuminating means in response to the amount of light falling thereon,
  a light source adapted to emit light onto both of said photosensitive devices,
 light interrupting means interposed and mounted for cyclic movement relative to said light source and said photosensitive devices, said light interrupting means comprising an opaque element including a single window portion which is adapted to sequentially and alternately gradually vary the amount of light from said light source falling on each of said photosensitive devices during one portion of the cyclic movement of said element and is further adapted to block the light from falling on one of said photosensitive devices while permitting substantially the full amount of the light to fall on the other of said photosensitive devices during other portions of the cyclic movement of said element, and
 drive means for moving said element through a repeating cycle.

2. A display device according to claim 1 wherein said window portion comprises a slot in said element covered with a material which, with respect to said slot, has a substantially transparent central portion and opposite end portions extending from said central portion, each of said end portions gradually increasing in density to light, in a direction away from said central portion, from substantially transparent to substantially opaque.

3. A display device according to claim 2 wherein said material is a photographic film.

4. A display device according to claim 2 wherein said opaque element is a disc;
said drive means comprises a motor means drivingly connected to said disc for rotating said disc through a rotation cycle about an axis;
said first and second photosensitive devices are disposed in generally diametrically opposed relation to the rotational axis of said disc; and
said slot is arcuate and is located to move over said photosensitive devices during the rotational cycle of said disc with the midpoints of said slot end portions being alternately disposed over both of said photosensitive devices during two separate portions of the rotational cycle of said disc.

5. A display device according to claim 1 wherein said element is mounted for reciprocative movement along a longitudinal axis;
said drive means comprises a motor means drivingly connected to said element for moving said element through a reciprocative cycle;
said window portion comprises an elongated, longitudinally extending slot in said element and covered by a material which, with respect to said slot, has a substantially transparent central portion and opposite end portions extending from said central portion, each of said end portions gradually increasing in density to light, in a direction away from said central portion, from substantially transparent to substantially opaque, said slot being located to move over said photosensitive devices during the reciprocative cycle of said element with the midpoints of said end portions being alternately disposed over both of said photosensitive devices during two separate portions of the reciprocative cycle of said element.

6. A display device according to claim 1 wherein said opaque element is a disc;
said drive means comprises a motor means drivingly connected to said disc for rotating said disc through a rotational cycle about an axis;
said first and second photosensitive devices are disposed in generally diametrically opposed relation to the rotational axis of said disc; and said window portion comprises a crescent-shaped, open slot in said disc providing a variable area through which light from said light source can reach said photosensitive devices during the rotational cycle of said disc, the opposite end portions of said slot being alternately disposed to permit light from said light source to reach the said photosensitive devices during two separate portions of the rotational cycle of said disc.

7. A display device according to claim 6 including first and second light reflecting chambers disposed inside said housing and located in generally diametrically opposed relation to the rotational axis of said disc, each of said chambers including bottom, top and side walls and being substantially closed except for an aperture in said top wall thereof located to be selectively aligned with said slot during the rotational cycle of said disc and having a shape generally corresponding to the shape of one of said slot end portions in the direction of disc travel; and said first and second photosensitive devices being disposed inside said first and second chambers, respectively, and mounted on said top wall thereof in radially outwardly spaced relation to the respective aperture whereby light admitted through said aperture reflects from the interior surfaces of the chamber onto said photosensitive device.

8. A display device according to claim 1 including display means in at least one of said display compartments for carrying a plurality of said display transparencies and adapted to sequentially move each of said display transparencies between a mondisplay position and a display position located between said light transmitting mirror and the respective illuminating means;

actuation means connected to said display means for moving said display transparencies to and from the display position; and means for selectively actuating said actuation means for a predetermined time interval to move one of said display transparencies from the display position to the nondisplay position and to move the next display transparency from the nondisplay position to the display position.

9. A display device according to claim 8 wherein said display means includes a hollow, transparent drum rotatably mounted in at least one of said display compartments and adapted to carry a plurality of said display transparencies in circumferentially spaced relationship on a peripheral surface thereof;

a respective one of said illuminating means is disposed inside said drum and is adapted to transmit light through a display transparency located in the display position and through said drum towards said light transmitting mirror; and said actuation means comprises a motor means drivingly connected to said drum for rotating said drum.

10. A display device according to claim 9 wherein said drum motor means is an electrical motor; and said means for selectively actuating said actuation means includes a further photosensitive device which is located in the vicinity of and in spaced relationship to said first and second photosensitive devices, which is electrically interconnected between said drum drive motor and a source of electrical power and which is operable to energize said drum motor in response to light falling thereon;

an opening in said opaque element spaced from said window portion such that, during the cyclic movement of said element, said further photosensitive device is exposed to light from said light source through said opening and thereby energizes said drum drive motor to move display transparency from the display position towards the nondisplay position; and means for deenergizing said drum drive motor when the next display transparency has been moved to the display position.

11. A display device according to claim 1 wherein each of said illuminating means is located to transmit light directly towards said mirror; and each of said display transparencies is located in the light path of the respective illuminating means.

12. A display device comprising a housing having a viewing opening, a first display compartment substantially aligned with said viewing opening and a second display compartment disposed at substantially a right angle to said first display compartment;

a hollow transparent drum rotatably mounted in each of said display compartment a plurality of circumferentially spaced display transparencies indicia carried on a peripheral surface of each of said drums;

a light transmitting mirror located said housing between said viewing window and said display compartments and disposed at an angular relationship with said display compartments;

an electrical motor drivingly connected to each of said drums for independently rotating each of said drums and for sequentially moving each of said display transparencies from a nondisplay position to a display position;

illuminating means disposed inside each of said drums for transmitting light through the respective drum and a display transparency located in the display position directly towards said light transmitting mirror;

control means for sequentially and alternately brightening one of said illuminating means while simultaneously darkening the other of said illuminating means so as to cause the indicia from both of said display transparencies located in the display position to merge and alternate when viewed through said viewing opening, said control means comprising electrical circuit means interconnecting said illuminating means with a source of electrical power including first and second voltage controls, each electrically interconnected between one of said illuminating means and said power source, and further including first and second photosensitive devices, each electrically connected to one of said voltage controls for regulating the voltage supplied through the respective voltage control to the respective illuminating means in response to the amount of light falling thereon, a light source adapted to emit light onto said first and second photosensitive devices, an opaque disc interposed and mounted for rotational movement relative to said light source and said first and second photosensitive devices, said first and second photosensitive devices being generally diametrically disposed relative to the rotational axis of said disc, a single window portion in said disc which is adapted to sequentially and alternatively gradually vary the amount of light from said light source falling on each of said first and second photosensitive devices during one portion of the rotational cycle of said element and is further adapted to block the light from falling on one of said photosensitive devices while permitting substantially the full amount of the light to fall on the other of said photosensitive devices during other portions of the rotational cycle of said element, and drive means for rotating said disc through a rotational cycle; and means for alternately and sequentially energizing said drum drive motors for a predetermined time interval whereby one of said drums is rotated to move a display transparency from the display position to a nondisplay position and to move the next display transparency from a nondisplay position to the display position while the respective illuminating means is dimmed and the other illuminating means is brightened.

13. a display device according to claim 12 wherein
said drum drive motors are interconnected in said circuit means; and
said means for selectively and alternately energizing said drum drive motors includes
   third and fourth photosensitive devices, each interconnected in said circuit means between the electrical source and one of said drum drive motors and operable to energize the respective drum drive motor in response to light falling thereon, said third and fourth photosensitive devices being disposed in generally diametrically opposed relation to the rotational axis of said disc and in circumferentially spaced relation to said first and second photosensitive devices,
   an opening in said disc and circumferentially spaced from said window portion whereby, during the rotational cycle of said disc, said third and fourth photosensitive devices are alternately and sequentially exposed to light from said light source through said opening and thereby energize the respective drive motor, and
   means for deenergizing each of said drum drive motors after the respective drum has been moved to a position where the next display transparency is in the display position.

14. A display device according to claim 13 wherein said last-mentioned means includes
   a pair of switch means, each interconnected in said circuit means between the electrical power source and one of said drum drive motors and movable between a normal first position to permit flow of electrical power to the respective drum drive motor and a second position to interrupt the flow of electrical power to the respective drum drive motor; and
   switch actuation means on each of said drums located at positions corresponding to the display position for each of said display transparencies, said switch actuation means operable for moving the respective switch to the second position when the respective drum is moved to a display position and for permitting the respective switch to move to the first position when the respective drum is initially moved from one display position towards the next display position.

15. A display device according to claim 14 wherein each of said switches comprises a reed switch located in the proximity of the travel path of the respective drum and including normally closed contacts which can be actuated open by an external magnetic field produced by a permanent magnet; and
said switch actuation means comprises a plurality of permanent magnets mounted on the outer periphery of each of said drums and having the appropriate polarity for actuating the contacts of the respective reed switch open when each of the magnets is moved in close proximity with the respective reed switch.

16. A display device according to claim 13 wherein
said window portion comprises an arcuate slot covered with a material which, with respect to said slot, has a substantially transparent central portion and opposite end portions extending from said central portion, each of said end portions gradually increasing in density to light, in a direction away from said central portion, from substantially transparent to substantially opaque; and
said slot is located to selectively move over said photosensitive devices during the rotational cycle of said disc with the midpoints of said slot end portions being alternately disclosed over both of said first and second photosensitive devices during two separate portions of the rotational cycle of said disc.

17. A display device according to claim 13 wherein
said window portion comprises a crescent-shaped, open slot in said disc providing a variable area through which light from said light source can reach said photosensitive devices during the rotational cycle of said disc, the opposite end portions of said slot being alternately disposed to permit light from said light source to reach both of said photosensitive devices during two separate portions of the rotational cycle of said disc.

18. a display device according to claim 17 including
first and second light reflection chambers disposed inside said housing and located in generally diametrically opposed relation to the rotational axis of said disc, each of said light reflecting chambers including bottom, top and side walls and being substantially closed except for an aperture in said top wall thereof located to be selectively aligned with said slot during the rotational cycle of said disc and having a shape generally corresponding to the shape of one of said slot end portions in the direction of disc travel; and
said first and second photosensitive devices being disposed inside said first and second light reflecting chambers, respectively, and mounted on said top wall thereof in radially outwardly spaced relationship to the respective aperture whereby light admitted through said aperture reflects from the interior surface of said light reflecting chamber onto said photosensitive device.

* * * * *